United States Patent
Betts et al.

(10) Patent No.: US 9,329,913 B2
(45) Date of Patent: May 3, 2016

(54) UNIFYING RELATED WEB SERVICE PORTS USING PORT POINTERS IN PROXY MEDIATION

(75) Inventors: Ryan T. Betts, Framingham, MA (US); Moshe M. E. Matsa, Cambridge, MA (US); Eric D. Perkins, Boston, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 568 days.

(21) Appl. No.: 12/328,882

(22) Filed: Dec. 5, 2008

(65) Prior Publication Data

US 2010/0146617 A1 Jun. 10, 2010

(51) Int. Cl.
*G06F 15/16* (2006.01)
*G06F 9/54* (2006.01)
*H04L 29/08* (2006.01)

(52) U.S. Cl.
CPC ............... *G06F 9/546* (2013.01); *G06F 9/541* (2013.01); *G06F 2209/544* (2013.01); *H04L 67/02* (2013.01)

(58) Field of Classification Search
CPC .......... G06F 9/546; G06F 9/541; H04L 67/02
USPC .................... 709/203, 219, 227, 230
See application file for complete search history.

(56) References Cited

U.S. PATENT DOCUMENTS

| 7,694,140 | B1* | 4/2010 | Sachenko et al. ............. 713/170 |
| 2005/0220139 | A1* | 10/2005 | Aholainen .................... 370/466 |
| 2006/0136600 | A1* | 6/2006 | Holdsworth .............. G06F 9/50 709/245 |
| 2006/0265719 | A1* | 11/2006 | Astl ........................ G06F 9/547 719/328 |
| 2007/0067458 | A1* | 3/2007 | Chand ........................... 709/226 |
| 2010/0049628 | A1* | 2/2010 | Mannava et al. ................. 705/27 |

* cited by examiner

*Primary Examiner* — John MacIlwinen
(74) *Attorney, Agent, or Firm* — Patents on Demand P.A.; Brian K. Buchheit; Scott M. Garrett

(57) ABSTRACT

A Web service description can be extended to cross reference a front-side port associated with a client using a Web service and a back-side port associated with a server providing the Web service. The extending of the Web service description can occur in a standards compliant manner for a programming language within which the Web service description is specified and for a repository in which the Web service description is maintained.

15 Claims, 2 Drawing Sheets

Prior Art 310

```
<service name="ExampleCompanySoapRpcLitTestSvc">
  <port name="Soap12TestRpcLitPort"
binding="tns:Soap12TestRpcLitBinding">
    <soap12:address location="http://www.ExampleCompany.net/soap12/test-rpc-lit"/>
  </port>
  <port name="Soap11TestRpcLitPort"
binding="tns:Soap11TestRpcLitBinding">
    <soap11:address location="http://www.ExampleCompany.net/soap12/test-rpc-lit"/>
  </port>
</service>
```

Proxy Enhancement 320

```
<service name="ExampleCompanySoapRpcLitTestSvc">
  <port name="Soap12TestRpcLitPort"
binding="tns:Soap12TestRpcLitBinding">
    <soap12:address location="http://www.ExampleCompany.net/soap12/test-rpc-lit"/>
  </port>
  <port name="Soap11TestRpcLitPort"
binding="tns:Soap11TestRpcLitBinding"
  ext:backside-port="tns:Soap12TestRpcLitPort" >    ─322
    <soap11:address location="http://www.ExampleCompany.net/soap12/test-rpc-lit"/>
  </port>
</service>
``` ext:backside-port=serviceprovider.com\portServiceA ─324

FIG. 3

UNIFYING RELATED WEB SERVICE PORTS USING PORT POINTERS IN PROXY MEDIATION

BACKGROUND OF THE INVENTION

The present invention relates to the field of Web services and, more particularly, to unifying related Web service ports using port pointers in proxy mediation.

Web services description language (WSDL) is an interface description language, defining the syntax of protocols used for network communications. WSDL is organized in a hierarchical structure, with data definitions, message types, operations, ports, and services. A port defines a set of messages and binds them to a specific transport and data syntax. For instance, Internet domain name service (DNS) can have two ports, one port which accepts User Datagram Protocol (UDP) traffic and another which accepts Transmission Control Protocol (TCP) traffic.

Although WSDL provides a means to reuse different elements using naming conventions, several problems with repetition and verbosity still exist. Often a service provider will use a single service that provides the same operations over multiple protocols. Some WSDL files associate several ports for a single port type, each with a different binding. For example, one might use SOAP 1.1 and another might use SOAP 1.2. There is currently no way to link these two ports, even though these two different protocols are effectively identical. Further, no easy way exists to explain to a proxy using WSDL code that one port form should be mediated to the other so that a backend server need be concerned with only a single port.

BRIEF DESCRIPTION OF THE SEVERAL VIEWS OF THE DRAWINGS

FIG. 3 is a schematic diagram illustrating a namespace extension for proxy enhancement in accordance with an embodiment of the inventive arrangements disclosed herein.

DETAILED DESCRIPTION OF THE INVENTION

Figure 1:
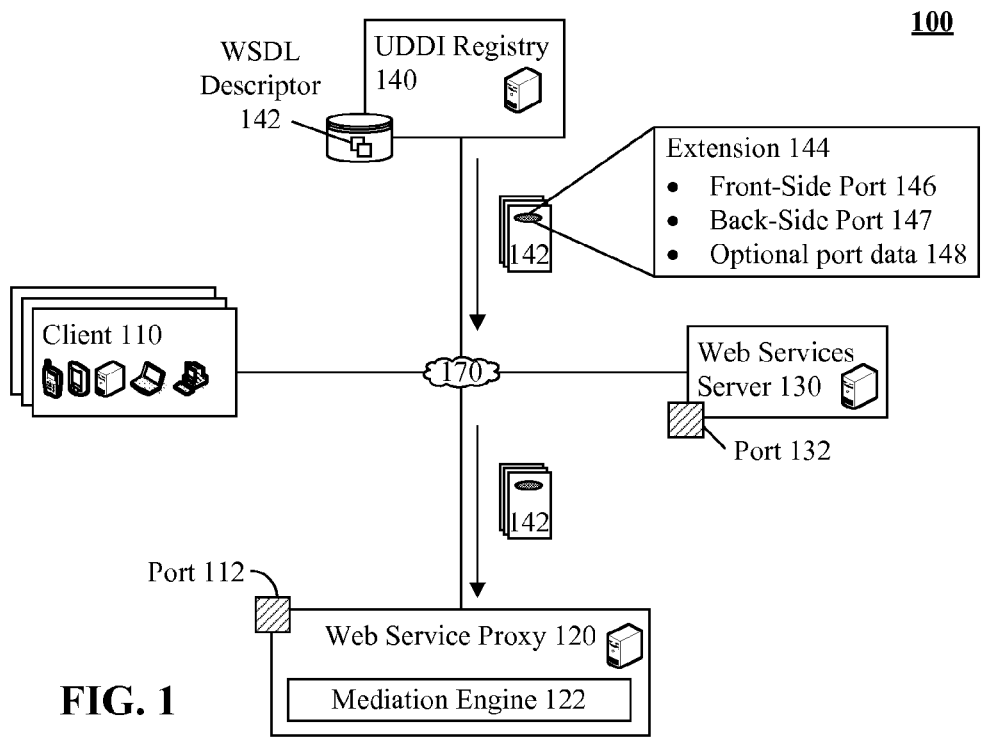
FIG. 1 is a schematic diagram illustrating a system for enabling Web service proxy mediation using port pointers in accordance with an embodiment of the inventive arrangements disclosed herein.

The present invention discloses a solution for unifying related Web service ports using port pointers in proxy mediation. In the solution, a mediation relation between two ports can be specified within a WSDL artifact. Mediation can be facilitated by a port pointer which can be used to define the cross-relationship between related Web services in a standards compliant manner. Metadata within the WSDL can specify the "front-side" behavior for Web services, the "back-side" behavior/format, and the mediation required by the proxy.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product on a computer usable storage medium having computer usable program code embodied in the medium. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. Examples of a computer readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer readable media can include transmission media, such as those supporting the Internet, an intranet, a personal area network (PAN), or a magnetic storage device. Transmission media can include an electrical connection having one or more wires, an optical fiber, an optical storage device, and a defined segment of the electromagnetic spectrum through which digitally encoded content is wirelessly conveyed using a carrier wave.

Note that the computer usable or computer readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in machine code. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 for enabling Web service proxy mediation using port pointers in accordance with an embodiment of the inventive arrangements disclosed herein. In system 100, a Web Services Description Language (WSDL) descriptor 142 can include a port pointer able to assist proxy 120 in Web service mediation. WSDL descriptor 142 can be conveyed from Universal Description, Discovery, and Integration (UDDI) registry 140 to proxy 120 via network 170. Web services server 130 providing a service on port 132 can be assisted by proxy 120. Client 110 accessing a service through port 112 can have the request automatically mediated by proxy 120 to a port 132. For instance, proxy 120 can translate domain name server (DNS) requests from a user datagram protocol (UDP) binding to a transport control protocol (TCP) binding and the inverse.

In one embodiment, an extension 144 can be specified within the WSDL descriptor 142. The extension 144 can define a mediation relationship between two or more ports. The extension 144 can define a front-end port 146, a back-end port 147, and optional additional data 148 to be used by the proxy 120. In system 100, the front-side port 146 can correspond to port 112 and the back-side port 147 can correspond to port 132.

For example, in one implementation the extension 144 can be an attribute named (by a predefined standard) QName and attached to a port 146, which is considered a front-end port. The value of the attribute can be a QName of a port 147, which is considered a back-end port. No additional information 148 is needed for this implementation, which can establish a relationship between ports 112, 132 using a single extension attribute.

The Web service proxy 120 can facilitate bi-directional mediation without being provided with semantic knowledge of all points within the WSDL pipeline. Extension 144 can indicate the association between port 112, 132 which can allow proxy 120 to mediate requests and responses as necessary. In one embodiment, during port outages, descriptor 142 can enable proxy 120 to identify linked ports for a service which can be used when ports (such as port 132) are unavailable. This fallback functionality can be useful for implementing fault tolerance techniques, dynamic load balancing techniques, autonomic computing systems, and the like.

Mediation can be performed by mediation engine 122 which can request and process extension 144. Engine 122 can parse extension 144 and determine linked ports. In one embodiment, port associations can be cached and updated through interval polling of descriptor 142 from UDDI registry 140.

As shown in system 100, WSDL 142 can completely, unambiguously, and in a standards compliant manner specify the Web services available at the "front-end" of the proxy 120 to customers (clients 110) of the Web service. The extension 144 carries all the data needed to inform proxy 120 of the cross-relationships of the ports 112, 132. Thus, the WSDL 142 specifies (A) front-side behavior, (B) back-side behavior, and (C) mediation required of the proxy 120; all with minimal changes being made to the WSDL descriptor 142.

As used herein, port 112, 132 can include a network address associated with a reusable binding. A network address can include a uniform resource identifier (URI) such as a fully qualified domain name (FQDN), internet protocol (IP) address, and the like. Bindings can include one or more transport protocols and one or more data formats.

Network 170 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 170 can include local components and data pathways necessary for communications to be exchanged among computing device components and between integrated device components and peripheral devices. The network 170 can also include network equipment, such as routers, data lines, hubs, and intermediary servers which together form a packet-based network, such as the Internet or an intranet. The network 170 can further include circuit-based communication components and mobile communication components, such as telephony switches, modems, cellular communication towers, and the like. The network 170 can include line based and/or wireless communication pathways.

System 100 is not to be construed as restricted to WSDL, and other markup based languages designed to describe Web services can be used (e.g., Web Services Experience Language (WSXL), Semantic Web Services Language (SWSL), Web Service Modeling Language WSML, etc.). These languages will need to support extension attributes (e.g., extension 144) or some similar language construct. The UDDI registry 140 can include a private UDDI as well as a public UDDI registry. Further, any of a variety of Web service registries (e.g., WEBSPHERE SERVICE REGISTRY AND REPOSITORY (WSRR), Electronic Business using eXtensible Markup Language (ebXML) Registry, XMethods registry, etc.) can substitute for UDDI registry 140 and still be within scope of the present invention.

Figure 2:
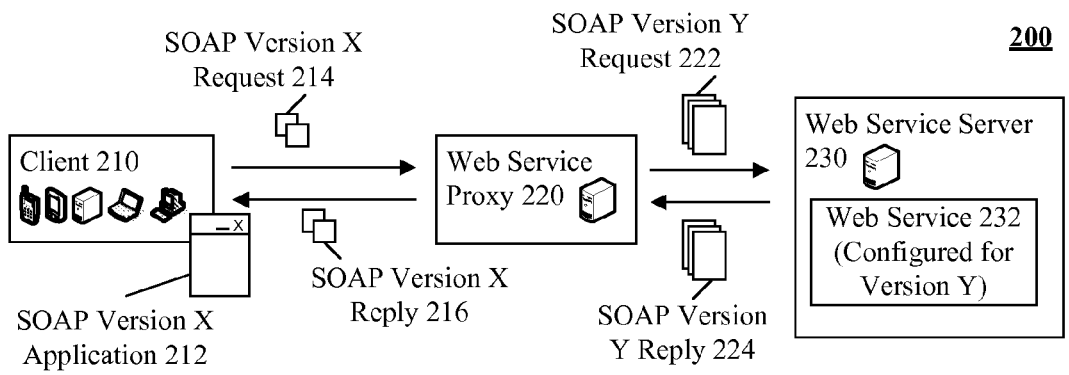
FIG. 2 is a schematic diagram illustrating an embodiment showing a Web service proxy mediating requests between different ports in accordance with an embodiment of the inventive arrangements disclosed herein.

FIG. 2 is a schematic diagram illustrating an embodiment 200 showing a Web service proxy 220 mediating requests between different ports in accordance with an embodiment of the inventive arrangements disclosed herein. System 200 can be performed in context of system 100.

System 200 assumes that client 210 uses a Web service 232 provided by Web service server 230. The front-side port used by client 210 can be different from a back-side port provided by the Web service server 230. One reason for this can be that the client 210 is executing an application 212 using a version of SOAP (Version X) that is different from a version used by the server (Version Y). Historically, different ports were used by the server 230 depending upon which version of a compatible SOAP protocol was used (e.g., SOAP version 1.1 used one port and version 1.2 used a different port for a single Web service 232). The proxy 220 can utilize a WSDL extension (e.g., extension 144) to cross reference the different ports. The proxy can then transform incoming requests 214 into requests 222 directed to a proper back-side port and can transform reply 224 to a reply 216, coming from a proper front-side port.

It should be noted that the Web service proxy 220 is not strictly limited to performing port adjustments. In one contemplated embodiment, the proxy 220 can dynamically transcode messages from one standard (SOAP X) to conform to another standard (SOAP Y). Specifics of adjustments needed can vary depending upon differences between the various standards (e.g., differences between SOAP X and SOAP Y). Differences and actions to be taken by the proxy 220 can be configured on a per-service 232 basis, such as using extension data (e.g., other data 148) within the service's WSDL.

FIG. 3 is a schematic diagram illustrating a namespace extension 320 for proxy enhancement in accordance with an embodiment of the inventive arrangements disclosed herein. In FIG. 3, a WSDL document 310 can be modified to enhance Web service proxy performance. Prior art 310 describes two similar Web services ports provided by the same logical provider. Without a defined correlation between the ports mediation cannot be performed without querying a Web service registry and/or the provider for a suitable Web service.

WSDL document 320 illustrates a namespace extension 322 permitting a Web proxy to mediate between two or more ports. Extension 322 can be used as a pointer allowing bi-directional mediation of ports. In one embodiment, the namespace prefix "ext" can be used to link ports. For example, code segment 322 illustrates the simple object access protocol (SOAP) 1.1 test service is only available on the backend server in a SOAP 1.2 format.

In port pointer 324, a universal resource identifier (URI) can denote the resource for which a service is available. For instance, the port pointer 324 can be used to indicate the resource and directory path for which the port is to be mediated. The URI can include, but is not limited to, a canonical name, internet protocol (IP) address, and the like.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for Web service port mediation comprising:
  extending, in a web service descriptor, a Web service description of a web service provided by a web server to cross reference a front-side port associated with a client using a Web service provided by the web server and a back-side port associated with the web server providing the Web service, wherein the web service descriptor is used by a web service proxy implemented by computing machinery, wherein the extending of the Web service description occurs in a standards compliant manner for a WEB SERVICE DESCRIPTION LANGUAGE (WSDL) within which the Web service description is specified and for a repository in which the Web service description is maintained, wherein the client is implemented by a client computing machine; and
  publishing the extended Web service description in a Web service registry as a WSDL document accessible by the client and by a Web service proxy, wherein the Web service proxy utilizes the extended Web service description to mediate between the front-side port and the back-side port.

2. The method of claim 1, wherein the extending adds a single extension attribute to the Web service description, said extension attribute being associated with one of the front-side port and the back-side port, wherein a value of the extension attribute is associated with a different one of the front-side port and the back-side port.

3. The method of claim 1, wherein the Web service registry is a UDDI compliant registry.

4. The method of claim 1, further comprising:
receiving, at the web service proxy, traffic over a network from the client for the Web service, wherein said traffic is sent to the front-side port;
directing, by the web service proxy, the received traffic from the front-side port to the web server, wherein said directed traffic is conveyed to the back-side port of the web server;
receiving traffic from the web server to the client for the Web service, wherein said traffic originates from the back-side port; and
directing the received traffic from the back-side port to the client, wherein the directed traffic is conveyed from the front-side port to the client.

5. The method of claim 4, further comprising:
modifying traffic from the client to be processed by the web server from a first format to a second format, wherein the second format is utilized by the web server and the first format is utilized by the client; and
modifying traffic from the server to be processed by the client from the second format to the first format.

6. The method of claim 5, wherein the first format conforms to a first SOAP version standard, and wherein the second format conforms to a second SOAP version standard, which is different from the first SOAP version standard.

7. A computer program product for Web service port mediation comprising:
a non-transitory computer usable storage medium having computer usable program code embodied therewith, the computer usable program code comprising:
computer usable program code which, when executed by a processor, extends a Web service description to cross reference a front-side port associated with a client using a Web service and a back-side port associated with a server providing the Web service, wherein the extending of the Web service description occurs in a standards compliant manner for a WEB SERVICE DESCRIPTION LANGUAGE (WSDL) within which the Web service description is specified and for a repository in which the Web service description is maintained; and
computer usable program code, which when executed by processor, is configured to publish the extended Web service description in a Web service registry as a WSDL document accessible by the client and by a Web service proxy, wherein the Web service proxy utilizes the extended Web service description to mediate between the front-side port and the back-side port.

8. The computer program product of claim 7, wherein the extending adds a single extension attribute to the Web service description, said extension attribute being associated with one of the front-side port and the back-side port, wherein a value of the extension attribute is associated with a different one of the front-side port and the back-side port.

9. The computer program product of claim 7, wherein the Web service registry is a UDDI compliant registry.

10. The computer program product of claim 7, further comprising:
computer usable program code, which when executed by processor, is configured to receive traffic from the client for the Web service, wherein said traffic is sent to the front-side port;
computer usable program code, which when executed by processor, is configured to direct the received traffic from the front-side port to the server, wherein said directed traffic is conveyed to the back-side port of the server;
computer usable program code, which when executed by processor, is configured to receive traffic from the server to the client for the Web service, wherein said traffic originates from the back-side port; and
computer usable program code, which when executed by processor, is configured to direct the received traffic from the back-side port to the client, wherein the directed traffic is conveyed from the front-side port to the client.

11. The computer program product of claim 10, further comprising:
computer usable program code, which when executed by processor, is configured to modify traffic from the client to be processed by the server from a first format to a second format, wherein the second format is utilized by the server and the first format is utilized by the client; and
computer usable program code, which when executed by processor, is configured to modify traffic from the server to be processed by the client from the second format to the first format.

12. The computer program product of claim 11, wherein the first format conforms to a first SOAP version standard, and wherein the second format conforms to a second SOAP version standard, which is different from the first SOAP version standard.

13. A Web service proxy implemented as a computing machine configured to automatically mediate all traffic over a network directed to a front-side port to a different back-side port, wherein said Web service proxy is configured to extract cross reference information regarding which back-side port is associated with which front-side port from a Web service description for a Web service being mediated, wherein said Web service description is written in a WEB SERVICE DESCRIPTION LANGUAGE (WSDL), and wherein the Web service description comprises an extension that is compliant with WSDL standards to produce an extended Web service description, wherein the extension comprises data relating the front-side port to the back-side port, wherein the Web service proxy publishes the extended Web service description in a Web service registry as a WSDL document accessible by clients over the network and by the Web service proxy, wherein the Web service proxy utilizes the extended Web service description to mediate between the front-side port and the back-side port.

14. The Web service proxy of claim 13, wherein the extension comprises a single extension attribute, said extension attribute being associated with one of the front-side port and the back-side port, wherein a value of the extension attribute is associated with a different one of the front-side port and the back-side port.

15. The Web service proxy of claim 13, wherein the Web proxy is implemented within a computer usable program code contained in a storage medium, which when executed by a computing device causes the computing device to perform the actions for which the Web service proxy is configured, the computing device comprising one of:
- a client communicating with the front-side port;
- a server associated with the back-side port; and
- a computing device other than a client communicating with the front-side port and other than a server associated with the back-side port.

* * * * *